United States Patent [19]

Yoknis

[11] Patent Number: 4,933,689
[45] Date of Patent: Jun. 12, 1990

[54] METHOD AND APPARATUS FOR PRINT IMAGE ENHANCEMENT

[75] Inventor: Myron E. Yoknis, Windsor, Colo.

[73] Assignee: Hewlett-Packard Company, Palo Alto, Calif.

[21] Appl. No.: 427,077

[22] Filed: Oct. 25, 1989

[51] Int. Cl.⁵ .......................................... G01H 15/14
[52] U.S. Cl. ..................................... 346/154; 346/160
[58] Field of Search ...................... 364/523; 340/728; 358/2831287; 346/154, 160

[56] References Cited

U.S. PATENT DOCUMENTS

| | | | |
|---|---|---|---|
| 4,460,909 | 7/1984 | Bassetti et al. | 346/160 |
| 4,544,264 | 10/1985 | Bassetti et al. | 355/14 R |
| 4,544,922 | 10/1985 | Watanabe et al. | 340/728 |
| 4,553,173 | 11/1985 | Kawamura | 358/283 |
| 4,625,222 | 11/1986 | Bassetti et al. | 346/160 |
| 4,715,006 | 12/1987 | Nagata | 364/523 |
| 4,786,923 | 11/1988 | Shimizu | 346/160 |
| 4,847,641 | 7/1989 | Tung | 346/154 |

Primary Examiner—Donald A. Griffin

[57] ABSTRACT

A method for enhancing a displayed image of a display apparatus which produces a digitized image in a dot matrix format comprising: generating a first digital data signal comprising unitary signal pulses representative of continuous line portions of a character to be displayed; and generating a second digital data signal having sets of pulses corresponding to each unitary signal pulse in the first data signal, each set of pulses in the second data signal comprising a leading pulse and a trailing pulse, the leading pulse in each set of pulses being of equal duration and equal interval spacing from the immediately following pulse, the trailing pulse in each set of pulses being of equal duration and of equal interval spacing from the immediately preceding pulse.

12 Claims, 5 Drawing Sheets

METHOD AND APPARATUS FOR PRINT IMAGE ENHANCEMENT

BACKGROUND OF THE INVENTION

The present invention relates to print image enhancement techniques used in dot matrix printing machines, such as electrophotographic printing machines, and, more specifically, relates to modification of print signals to produce a printed image with visually softened edge contours.

Typically, non-impact printing machines are designed to create a printed image by printing a series of picture elements, pixels or dots, on a print medium, such as paper. In electrophotographic printing machines, laser printers for example, a desired image may be created by a light source which is caused to scan across the charged surface of photosensitive material in a succession of scan lines. Each scan line is divided into pixel areas and the light or laser beam is modulated such that some pixel areas are exposed to light and some are not, resulting in a predetermined series or pattern of overlapping pixels on each scan line. Wherever a pixel area is illuminated by the laser beam, the photosensitive material is caused to bear a charge pattern of pixels which images the subject that is being printed or reproduced. The printed copy is then obtained by developing the charged pattern and transferring the developed image to the print media.

The printed image produced by a dot matrix printer is a digitized or quantized image, sometimes referred to as a bit map image, of a desired analog image. The components of an analog image may be continuous in any orientation, while those of a bit map image must proceed in orthogonal, incremental steps. This constraint results in distortion in the bit map representation of an analog image. The bit map image typically consists of a large number of discrete pixels or dots organized in a predetermined (spatial) pattern.

The resolution of the bit map images produced by dot matrix printing machines is typically stated in the number of pixels or dots printed per inch. For example, a 300 dot-per-inch (dpi) printer has a higher resolution than a 240 dpi printer. A printer which produces 300 dpi in the horizontal row direction and 300 dpi in the vertical column direction has a 300 by 300 dpi resolution. At a resolution of 300 by 300 dpi, lines printed parallel or perpendicular to the scan direction print with very little visible distortion. However, diagonal lines produce jagged steps or staircase distortion which is quite visible to the human eye.

Distortion in bit map representations is a consequence of low resolution of the bit map or low sampling rates of the desired analog image. A typical approach to reducing this distortion has been to increase the resolution of the bit map image by increasing the number of dots in a fixed size image, i.e., reducing the dot size, which increases the spatial resolution. Increasing the resolution reduces the size of the step distortions as well as preserving much fine detail which is lost at lower resolution. However, increasing the resolution is expensive. The amount of data to be processed and stored is proportional to the number of pixels or cells in the bit map. For example, doubling the resolution of 300 by 300 dpi two-dimensional bit map results in a 600 by 600 dpi bit map which requires four times more memory and processing power. Further, a bit map image output device, such as a cathode ray tube (CRT) or printer, capable of displaying this higher resolution image must be used which may further increase the cost. While this solution has been used in many more sophisticated, high-end printers, it is not a practical solution for lower cost, low-end printers.

Another approach to reducing staircase-type distortion has been to modify the data signal which is used to actuate the display device, see, e.g., Bassetti et al., U.S. Pat. No. 4,460,909; Bassetti et al., U.S. Pat. No. 4,544,264; Watanabe et al., U.S. Pat. No. 4,544,922; Kawamura, U.S. Pat. No. 4,553,173; Bassetti et al., U.S Pat. No. 4,625,222; and Tung, U.S. Pat. No. 4,847,641; each of which is hereby specifically incorporated by reference for all that is disclosed therein. The present invention also utilizes the technique of data signal modification.

SUMMARY OF THE INVENTION

The present invention provides a technique for enhancing the appearance of characters printed by a non-impact printer such as a laser beam printer. Characters are printed using pixel rows with discontinuous beginning and end portions. These discontinuities create a grayed or slightly blurred appearance at the periphery of the characters which softens the staircase appearance of diagonal portions of the characters.

The print enhancement technique of the present invention may be implemented in circuitry interposed between character generator circuitry and the printing mechanism of a non-impact printer. The circuitry may be of a type that is relatively simple and inexpensive to produce and may be installed in an existing printing machine without modification to its existing hardware and software.

The invention may comprise a method for enhancing a displayed image of a display apparatus which produces a digitized image in a dot matrix format comprising: generating a first digital data signal comprising unitary signal pulses representative of continuous line portions of characters to be displayed; and generating a second digital data signal having sets of pulses corresponding to each unitary signal pulse in the first data signal, each set of pulses in the second data signal comprising a leading pulse and a trailing pulse, the leading pulse in each set of pulses being of equal duration and equal interval spacing from the immediately following pulse, the trailing pulse in each set of pulses being of equal duration and of equal interval spacing from the immediately preceding pulse.

The invention may also comprise a method of modifying an original digital data signal, produced by the character generator of a dot matrix printer, of the type comprising a series of continuous signal pulses associated with scan line portions of a series of characters which are to be printed, comprising: generating a modified set of signal pulses corresponding to each continuous signal pulse in the original data signal, each modified set of signal pulses including a central modified data pulse having a duration which is of a constant amount less than the pulse length of the corresponding signal pulse in the original data signal; a leading modified data pulse of a constant duration which precedes the central modified data pulse by a constant interval spacing; and a trailing modified data pulse of a constant duration which follows the central modified data pulse at a constant interval spacing.

The invention may also comprise a method for modifying an original digital data signal, produced by the character generator of a dot matrix printer, of the type comprising a series of continuous signal pulses of a first value associated with scan line portions of a series of characters which are to be printed and a series of continuous inverse signal pulses of a second value associated with unprinted scan line portions comprising: (a) generating a first intermediate signal having signal pulses of a predetermined duration produced in response to the leading edge of each first value signal pulse in the original data signal; (b) generating a second intermediate signal having signal pulses of a predetermined duration produced in response to the trailing edge of each signal pulse in the first intermediate signal; (c) generating a third intermediate signal having a first signal value when a first value signal pulse of the original data signal is in effect and when at the same time a signal pulse of the second intermediate signal is not in effect and having a second signal value at all other times; (d) generating a fourth intermediate signal having signal pulses of a predetermined duration produced in response to the trailing edge of each first value pulse of the original data signal; (e) generating a fifth intermediate signal having pulses of a predetermined duration produced in response to the trailing edge of each first value signal pulse in the original data signal; and (f) generating an enhanced digital data signal having a first signal value when the first signal value of the third intermediate signal is in effect and when at the same time a signal pulse of the fifth intermediate signal is not in effect and having a second signal value at all other times.

The invention may also comprise a method for printing characters with an electrostatic printer comprising: (a) differentially discharging scan line portions of an electrostatic medium which are associated with characters to be printed by application of a laser beam from a laser in a series of raster sweeps; (b) during portions of each raster sweep of the laser associated with characters to be printed: (i) energizing the laser for a relatively short, predetermined interval corresponding to a leading edge portion of the associated character; and then de-energizing the laser for a relatively short predetermined interval; (ii) re-energizing the laser for a relatively long, predetermined interval corresponding to a central portion of the associated character and then de-energizing the laser for a relatively short predetermined interval; (iii) re-energizing the laser for a relatively short predetermined interval corresponding to a trailing edge portion of the associated character and then de-energizing the laser.

The invention may also comprise a character display signal generating apparatus for use in a display device which produces a digitized image in a dot matrix format. The apparatus includes a character generator for generating a first digital data signal comprising unitary signal pulses representative of continuous line portions of characters to be displayed. The apparatus also includes character signal enhancement circuitry connected to the character generator for generating a second digital data signal having sets of pulses corresponding to each unitary signal pulse in the first data signal. Each set of pulses in the second data signal includes a leading pulse and a trailing pulse. The leading pulse in each set of pulses is of equal duration and equal interval spacing from the immediately following pulse. The trailing pulse in each set of pulses is of equal duration and of equal interval spacing from the immediately preceding pulse.

DETAILED DESCRIPTION OF A PREFERRED EMBODIMENT

The present invention is described as applied to an electrophotographic printer, such as a laser beam printer, although it is to be understood that the present invention is compatible with other dot matrix display devices such as thermal ink jet printers and cathode ray tubes (CRT). In dot matrix printers, each character is comprised of a matrix of cells, dots being filled-in cells and blanks being empty cells, which together define the desired character. The dots and blanks are arranged in a matrix of positions that are typically arranged in horizontal rows and vertical columns that are adjacent, parallel and evenly spaced. The intersections of the rows and columns determine the locations of the cells, dots and blanks. The cells may overlap, depending upon the spacing between matrix intersections and cell diameter. Each matrix cell is represented in the apparatus by a binary data element with a binary one typically representing a dot, a filled cell, and a binary zero representing a blank, an empty cell. Data stored in the apparatus and representing one or more desired characters or character sets are typically known as bit maps or bit mapped images. Such bit maps may be characterized as digital representations of analog characters.

In an electrophotographic printing machine, such as a laser beam printer, printing is produced by creating an electrostatic representation of the desired image on a photoreceptive surface, developing the image and then fusing the image to a print media such as paper. Printing on a laser beam printer requires the interaction of several different technologies to provide a page of printed output. In printers which utilize plain bond paper or other image receiving media not coated with photoreceptive material, the printing process is centered around the image formation on a rotating photosensitive drum.

Figure 1:
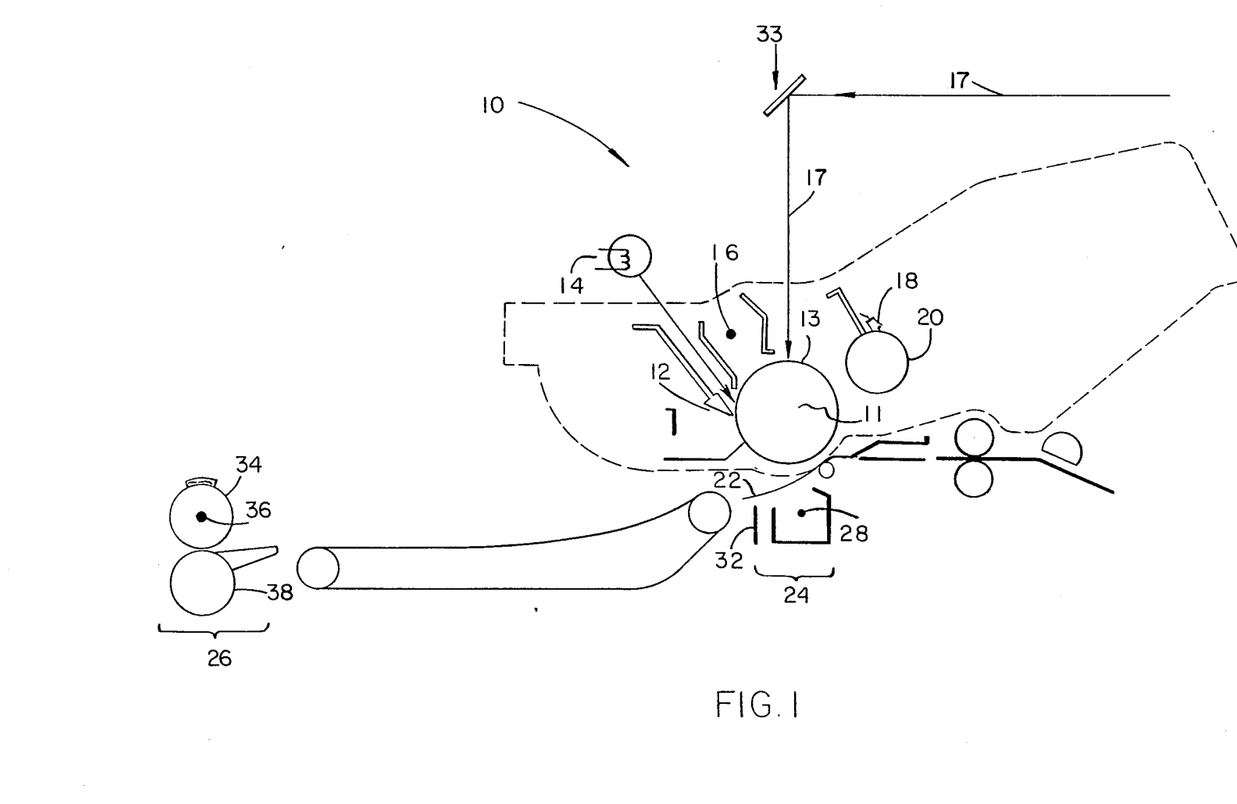
FIG. 1 is a block diagram of a typical electrophotographic printing machine.
Figure 2:
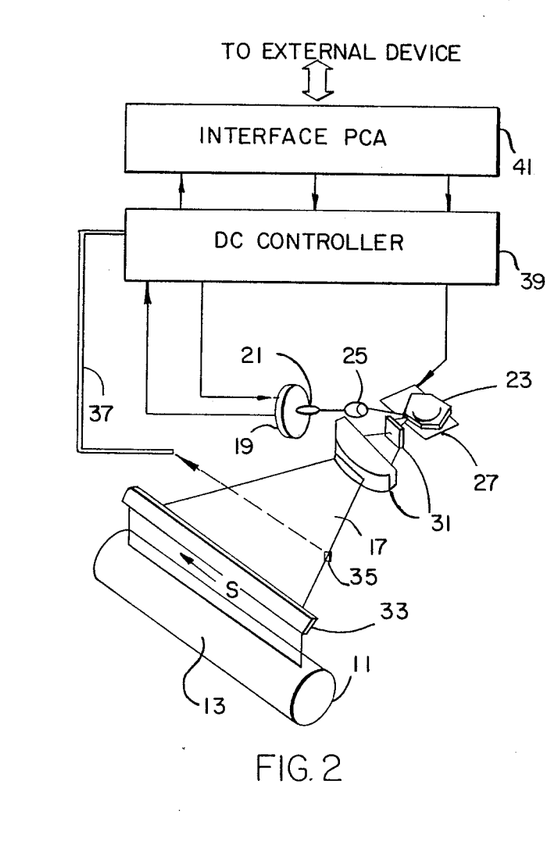
FIG. 2 is a diagram illustrating a solid state laser apparatus and the associated control circuitry for producing a scanning laser beam for the machine shown in FIG. 1.
Figure 3:
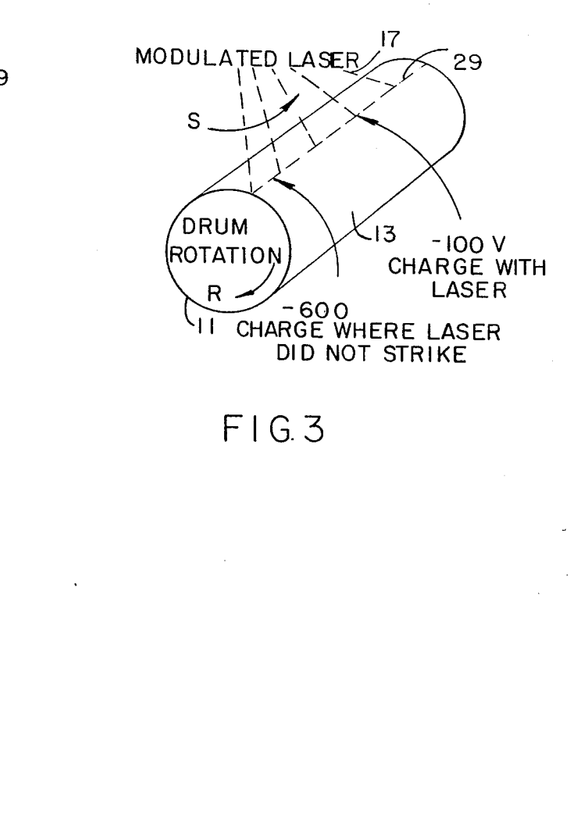
FIG. 3 is a diagram illustrating the write process on a photosensitive drum for the machine shown in FIG. 1.

Referring now to FIGS. 1, 2 and 3, block diagrams illustrating a typical electrophotographic laser beam printing machine 10 are shown. A photosensitive drum 11 is driven by a motor (not shown) in direction R. The drum 11 is a metal cylinder, such as extruded aluminum, typically coated with a layer of organic photoconductive material. During the printing process, the drum 11 is constantly rotating and may make several complete rotations per printed page. Prior to forming the image for a given section of print, the drum's electrostatic surface 13 must be prepared to hold the desired electrostatic image by physically and electrostatically cleaning the drum. Physical cleaning is accomplished by a rubber cleaning blade 12 which scrapes any toner remaining from a previous cycle off the drum 11 and into a debris cavity. The drum 11 is then electrostatically cleaned by erase lamps 14 which illuminate the photosensitive material of the drum to neutralize any electrical charges which may have previously been on the drum 11. The cleaned surface 13 of the electrostatic drum 11 is then conditioned by the application by a uniform negative charge. The rotating drum 11 passes the photosensitive material through an ionized region created by a charge corona generator 16 in which negative charges migrate from the corona generator 16 to the surface of the drum 11. After rotating past the charge corona generator 16, the drum 11 has a uniform negative 600 volt potential on its surface 13. During writing, a laser beam 17 is utilized to discharge the drum 11 surface potential in selected areas by focusing the laser light on selected portions of the photoconductive drum surface 13. In this manner, an electrostatic image is created which is later developed into a visible image and transferred to the print media.

The laser beam 17 is produced by a solid state laser which is turned on and off by simply supplying or denying power. The laser light produced by the diode 19 is collimated into a well-defined beam by collimator lens 21 and focused onto a scanning mirror 23 by cylindrical lens 25. The scanning mirror 23 is a six-sided rotating polygon mirror which is rotated at constant speed by the scanner motor 27. As the scanning mirror 23 rotates the laser beam 17 sweeps in an arching direction as indicated by arrow S. The sweeping laser beam 17 is focused on a horizontal line 29 on the photosensitive surface 13 of the drum 11 by the focusing lens 31 and mirror 33.

As the laser beam 17 sweeps the length of the drum 11 in direction S and because the drum is rotating in direction R, the entire surface 13 of the drum is covered with a raster image. The speed of the scanner motor 27 which rotates the scanning mirror 23 and the speed of the main motor which rotates the drum 11 are synchronized so that each successive sweep of the laser beam 17 is offset on the surface of the drum 11 by 1/300 of an inch. The laser 19 can also be turned on and off thereby modulating the laser beam 17 at such a rate as to place a dot of light every 1/300 of an inch in the horizontal direction along line 29 thereby achieving a 300 by 300 dots-per-inch (dpi) resolution. At the beginning of each sweep prior to the laser beam reaching the drum 11, the laser beam 17 is reflected off a beam detector mirror 35 into an optical fiber 37. This momentary pulse of light is transmitted through the optical fiber 37 to the DC controller 39 where it is converted to an electrical signal used to synchronize the output of data for one sweep (scan line) with the rest of the data and for other printer control and test functions.

After writing, the drum 11 has an invisible electrostatic latent image on its photosensitive surface 13. The portions of the drum surface 13 that were not exposed to the laser beam 17 are still at the negative 600 volt potential, but those portions exposed to the laser light have now been discharged to approximately negative 100 volts. After writing, the electrostatic image is developed into a visible image on the drum surface 13.

At the developing station, developing material called toner 18 is placed on the electrostatic image. The toner material is a powdery substance made of black plastic resin bound to iron particles. The iron in the toner causes an attraction of the toner to a metallic rotating cylinder 20 having a permanent magnet (not shown) running the length of the cylinder. The plastic toner particles 18 obtain a negative surface charge by rubbing against the cylinder 20 which is connected to a negative DC supply. This electrostatic charge obtained by the toner is such that the toner particles 18 are attracted to the areas of the drum surface 13 which have been exposed to the laser light and repelled from the surface areas not exposed.

At the transfer station 24 the toner image on the drum surface 13 is transferred to the print paper 22. The print paper 22, which is traveling at the same speed as that of the surface of the drum 11, contacts the surface of the drum. A corona assembly 28 produces positive charges which deposit on the back surface of the paper 22. The stronger positive charges on the paper pull the negatively charged toner particles 18 off the surface of the drum 11. A static charge eliminator 32 weakens the attractive forces between the negatively charged drum surface 13 and the positively charged paper 22 to prevent the paper 22 from wrapping around the drum 11. From the transfer station, the print paper 22 moves to the fusing station 26 and the drum 11 rotates to the cleaning station to prepare it to receive the next section of print.

At the fusing station 26, the toner is melted and forced into the print paper by heat and pressure to produce a permanent printed image. The fusing station 26 comprises a non-stick heat roller 34 that is heated internally by a high intensity lamp 36 and a soft pressure roller 38 that slightly compresses when pressure is applied to provide a large contact area between the paper and the upper heat or fusing roller 34. At this point, the toner 18 deposited on the paper 22 is melted and squeezed into the paper fibers.

The DC controller printed circuit assembly (PCA) 39 is the printer control system and is responsible for coordinating all activities involved in the printing process. The DC controller 39 provides the control signals which drive the laser beam 17, coordinating dot pattern data from the interface PCA 41 with paper size, sensitivity, and laser beam motion information.

Figure 4:
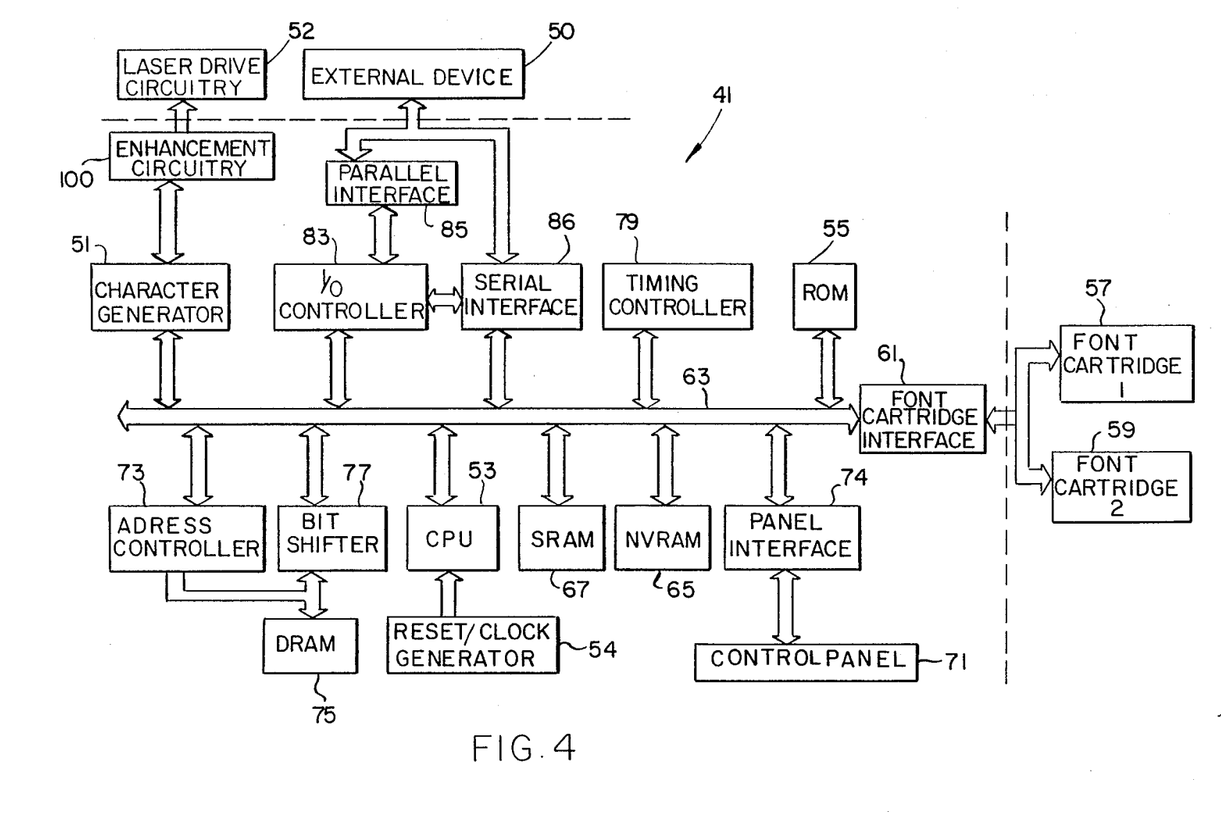
FIG. 4 is a block diagram of the Interface PCA of the machine of FIG. 1 showing the position of the enhancement circuitry of FIG. 9.

The interface PCA 41 includes a central processing unit (CPU) that controls the operation of the interface PCA 41 and a block of read-only memory (ROM) for storing the dot patterns or bit map images of desired character sets. Additional bit map image data may be provided in add-on ROM cartridges. The interface PCA 41 is responsible for correct communication between the printer and external devices 50, such as a personal computer, established by configuration settings selected at the printer control panel 71 (as shown in FIG. 4). Coded data from the external device 50 is then processed according to the control panel 71 settings or printer commands and is converted to dot data for modulating the laser beam 17.

As described hereinabove, the actual data or bit map images for the desired characters and graphics are stored in memory (ROM) in the interface PCA 41 with additional character sets provided by add-on ROM (plug in) font cartridges. Video circuity included in the interface PCA 41 converts the character and graphics data, bit map images, to dot data which is output to the DC controller to drive the laser 19.

The laser printer described hereinabove is a bi-level, two-dimensional raster image output device in which each cell has a one bit (black/white) parameter. The solid state laser 19 is driven by a single, serial data modulation signal (video) provided to the DC controller 39 by the interface PCA 41.

FIG. 4 is a block diagram of the laser beam printer interface PCA 41 showing the position of circuit components to enhance the printed image according to the present invention and is directed to an embodiment for use with the laser printer shown in FIGS. 1 and 2. A character generator 51 provides serial data signals to modulate the laser beam 17 to provide the desired characters or graphics. Data from the character generator 51 is modified by enhancement circuitry 100 and is then provided to the laser drive circuitry 52 on the DC controller PCA 39.

Figure 5:
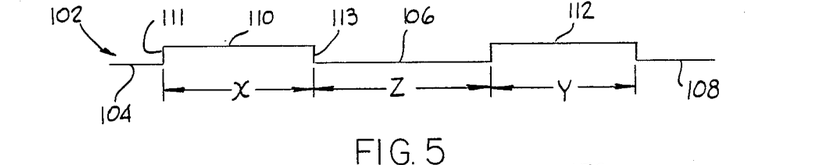
FIG. 5 is a diagram of a portion of an unmodified character generator signal.

The laser printer interface PCA 41 is controlled by CPU 53. The CPU 53 receives clock and reset signals from RESET/CLOCK GENERATOR 54. CPU 53 comprises a 16-bit microprocessor that executes programs stored in ROM 55. In addition to storing microprocessor controller programs to be executed in the CPU 53, the primary purpose of ROM 55 is to store the dot patterns to bit map images of the printer character sets or fonts. Font cartridges 57, 59 comprise plug-in ROM cartridges which provide additional character set dot pattern data to the printer for different, optional fonts. The font cartridge interface 61 buffers the main data bus 63 from the font cartridge 57, 59 connectors. Non-volatile random access memory (NVRAM) 65 is provided to store essential data such as printing data configuration and page count information entered via a control panel 71 which is connected to data bus 63 by PANEL INTERFACE 72. Static random access memory (SRAM) 67 provides additional address space for the microprocessor in CPU 53. The address controller 73 outputs address information enabling access to data stored in the four separate sections of the ROM 55. An expandable dynamic random access memory (DRAM) 75 is provided to store printing information, font information and other information input from external device 50. The microprocessor in the CPU 53 subdivides the DRAM memory space as required. The address controller 73 also outputs address information enabling access to data stored in the DRAM 75. A timing controller 79 generates the required timing signals when data is to be written or read from the DRAM 75 and also generates the data refresh signals for the DRAM 75. A bit shifter 77, in response to the commands from the control panel 71 or the external device 50, generates the necessary commands to offset or overlay printed characters and to shift data by 1to 15 bits. The I/O controller 83 controls the timing of the data input from the external device 50 to the CPU 53 via parallel interface connector 85. Serial data from external device 50 passes through serial interface connector 86. The character generator 51, responsive to commands from the CPU 53, converts the bit map image data stored in the ROM 55 or the font cartridges 57, 59 to dot data which is continuously output to the laser drive circuitry 52 in the form of a serial data signal 102 as shown in FIG. 5. The print enhancement circuitry 100 is interposed between the character generator 51 and the laser drive circuitry 52 to modify the serial data signal so that print enhancement techniques may be carried out.

Figure 7:
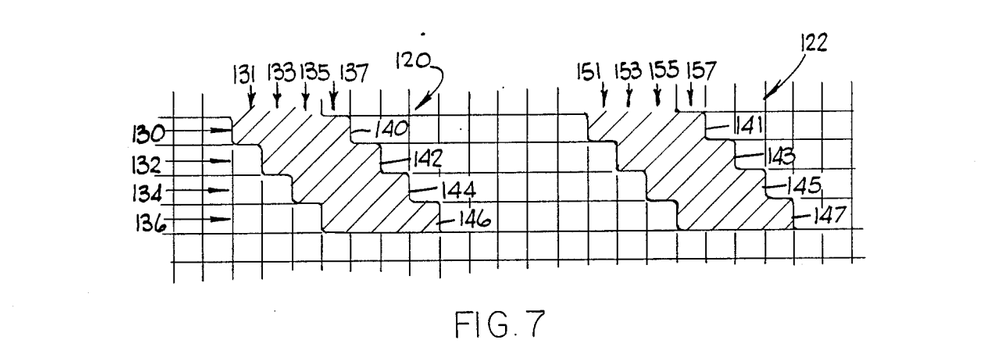
FIG. 7 is a top plan view of a diagonal portion of a character printed in response to an unmodified character generator signal.

As illustrated in FIG. 5, the serial data signal 102 comprises a plurality of low signal portions 104, 106, 108, etc., associated with a binary logic level "0" and a plurality of high portions 110, 112, etc. associated with a binary logic level "1". Each high portion or high pulse 110, 112 comprises a rising edge 111 and a falling edge 113. Pulses 110 and 112 are of duration "x" and "y", respectively. Low pulse 106 which separates pulses 110 and 112 is of duration "z". In the illustrated embodiment, the laser is actuated by the high portions and deactuated by the low portions of the signal. Thus, low signal portions correspond to unprinted or "white" regions of the associated display media and high signal portions correspond to printed or black regions on the display media. FIG. 7 illustrates magnified diagonal portions of two printed characters 120, 122, such as slash marks, which have been printed by a conventional laser printer which is not equipped with enhancement circuitry 100. Each character 120, 122 is formed from a series of continuous printed scan line portions, e.g. 140, 142, 144, 146 and 141, 143, 145, 147, etc., which are in turn formed from a plurality of adjacent black pixels arranged in rows 130, 132, 134, 136, etc., and columns 131, 133, 135, 137, etc., and 151, 153, 155, 157, etc. High signal portions 110, 112 correspond to the portions of characters 120, 122 which are located in pixel row 130.

Figure 6:
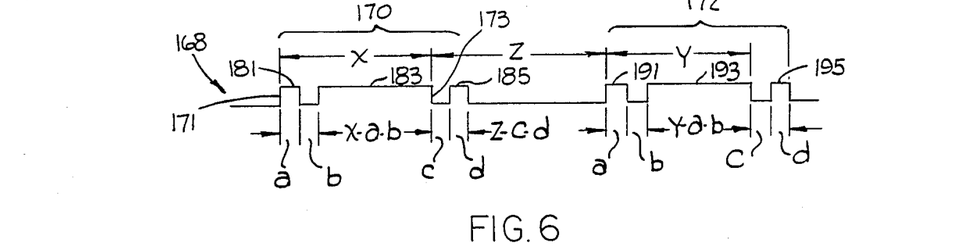
FIG. 6 is a diagram of the signal of FIG. 5 after modification by the circuitry of FIG. 9.

The "modified" or "enhanced" signal 168 produced by enhancement circuitry 100 is illustrated in FIG. 6. Each high signal portion, e.g. 110, 112, of character generator signal 102 which corresponds to a printed region of the display medium comprises a corresponding signal portion, e.g. 170, 172, in modified signal 168.

Each modified signal portion, e.g. 170, 172, comprises a set of three high pulses including leading high pulse, e.g. 181, 191; a central high pulse, e.g. 183, 193; and a trailing high pulse, e.g. 185, 195. Every leading high pulse, e.g. 181, 191, has the same duration "a" and is separated from its corresponding central high pulse, e.g. 183, 193, by the same duration interval "b".

Every trailing pulse, e.g. 185, 195, has the same duration "d" and is separated from its associated central high pulse, e.g. 183, 193, by the same duration interval "c". The leading edge, e.g. 171, of each leading high pulse, e.g. 181, is coincident in time with the leading edge, e.g. 111, of its corresponding signal pulse, e.g. 110, in signal 102. The trailing edge of each central high pulse, e.g. 173, of signal 168 is coincident in time with the trailing edge, e.g. 113, of the corresponding signal pulse, e.g. 110, in signal 104.

In one preferred embodiment of the invention in which the printer is a 300 dpi printer, such as that sold under the product designation LaserJet Series II by Hewlett-Packard Company at 5161 Lankershim Blvd., North Hollywood, Ca., 91601, operating at a rate of 8 standard-size (8.5 in.×11 in.) pages per minute, "a" is between 50 nanoseconds and 300 nanoseconds, and most preferably is approximately 100 nanoseconds; "b" is between 50 nanoseconds and 300 nanoseconds, and most preferably is approximately 150 nanoseconds; "c" is between 50 nanoseconds and 300 nanoseconds; and most preferably is approximately 150 nanoseconds; and "d" is between 50 nanoseconds and 300 nanoseconds, and most preferably is approximately 100 nanoseconds. The intervals "a" and "d" are sufficiently long and the intervals "b" and "c" are sufficiently short so that a continuous blurred or grayed region is provided at the leading and trailing edge of each associated character 121, 123, as further described below.

Figure 8:
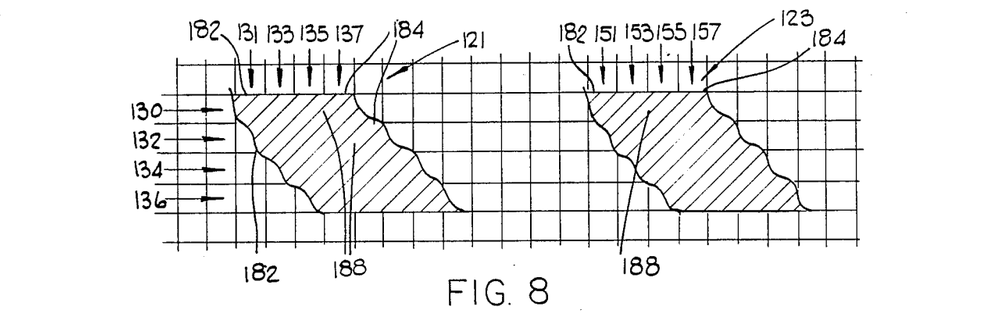
FIG. 8 is a top plan view of a diagonal portion of a character printed in response to a modified character generator signal.

FIG. 8 illustrates portions of characters 121, 123 printed in response to modified signal 168 which corresponds to the portions of characters 120, 122 shown in FIG. 7. Each pixel row portion of each character is provided with a leading gray or softened portion 182, a central black portion 188, and a trailing gray or softened portion 184. The leading and trailing gray portions 182, 184 are continuous with the central black portion 188. This blurring or graying at the edge portions of enhanced characters diminishes the staircase appearance which is present in diagonal edge portions of unenhanced characters.

Figure 9:
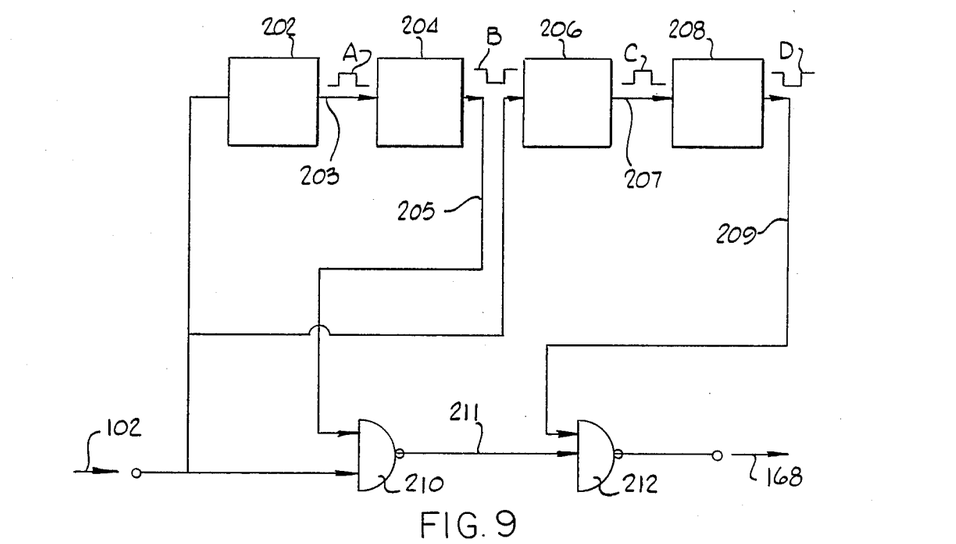
FIG. 9 is a detailed circuit diagram of character generator signal enhancement circuitry.
Figure 10:
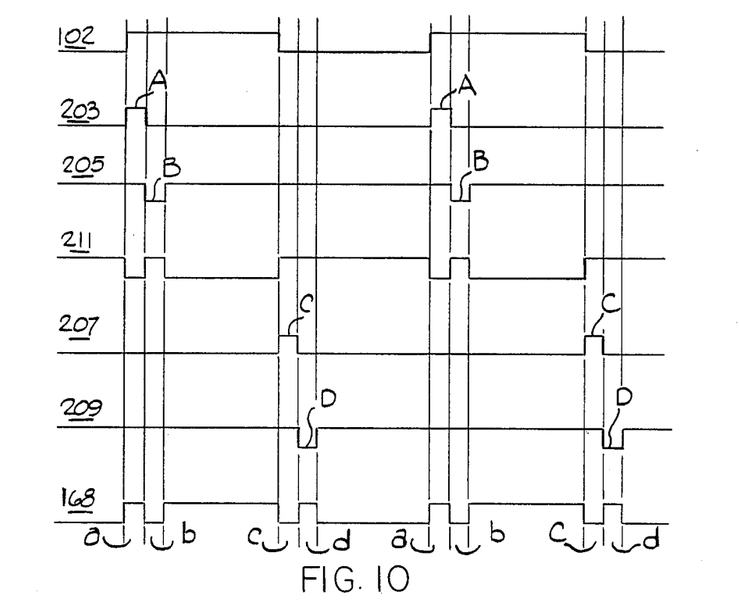
FIG. 10 is a diagram of signals produced by a character generator and by the circuitry of FIG. 9.

One preferred embodiment of enhancement circuitry 100, which is presently the best mode contemplated, is illustrated in FIG. 9. Signals produced by circuit components of circuit 100 are illustrated in FIG. 10.

Circuit 100 comprises four pulse generators 202, 204, 206, 208 and two NAND gates 210, 212. Signal 102 from character generator 51 is provided to one input of NAND gate 210 and also to the input of pulse generator 202. Pulse generator 202 generates a signal 203 with a high pulse A of duration "a" in response to a rising edge 111 in signal 102. The output 203 of pulse generator 202 is provided as input to pulse generator 204. Pulse generator 204 is triggered by the falling edge of pulse A and generates a low pulse B of duration "b" in response thereto. The output signal 205 of pulse generator 204 is provided to the second input of NAND gate 210. NAND gate 210 generates a low output in response to simultaneously receiving high signals at both of its outputs and otherwise generates a low output. The signal output of NAND gate 210 is indicated at 211.

Signal 102 is also provided to pulse generator 206 which generates a high pulse C of duration "c" in response to a falling edge in signal 102. The output 207 of pulse generator 206 is provided to pulse generator 208 which generates a low pulse D of duration "d" in response to a falling edge of pulse C. The signal output 209 from pulse generator 208 and the signal output 211 from NAND gate 210 are provided as inputs to NAND gate 212. NAND gate 212 generates an output signal 168 which is low whenever both of its inputs are high and which is otherwise high. The laser diode 19 is energized in response to a high output from gate 212 and is de-energized in response to a low output from gate 212.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method for enhancing a displayed image of a display apparatus which produces a digitized image in a dot matrix format comprising:
   generating a first digital data signal comprising unitary signal pulses representative of continuous line portions of characters to be displayed; and
   generating a second digital data signal having sets of pulses corresponding to each unitary signal pulse in said first data signal, each set of pulses in said second data signal comprising a leading pulse and a trailing pulse, the leading pulse in each set of pulses being of equal duration and equal interval spacing from the immediately following pulse, the trailing pulse in each set of pulses being of equal duration and of equal interval spacing from the immediately preceding pulse.

2. A method of modifying an original digital data signal, produced by the character generator of a dot matrix printer, of the type comprising a series of continuous signal pulses associated with scan line portions of a series of characters which are to be printed, comprising:
   generating a modified set of signal pulses corresponding to each continuous signal pulse in said original data signal, each modified set of signal pulses including a central modified signal pulse having a duration which is of a constant amount less than the pulse length of the corresponding signal pulse in the original data signal; a leading modified signal pulse of a constant duration which precedes said central modified signal pulse by a constant interval spacing; and a trailing modified signal pulse of a constant duration which follows said central modified signal pulse at a constant interval spacing.

3. The invention of claim 2 wherein said dot matrix printer has a 300 dots-per-inch resolution and wherein, at a printing rate of 8 pages per minute, the duration of each leading signal pulse is less than 300 nanoseconds and more than 50 nanoseconds; the interval spacing of each leading signal pulse from each corresponding central signal pulse is less than 300 nanoseconds and more than 50 nanoseconds; the duration of each trailing signal pulse is less than 300 nanoseconds and more than 50 nanoseconds; the interval spacing of each trailing signal pulse from each corresponding central signal pulse is less than 300 nanoseconds and more than 50 nanoseconds.

4. A method for modifying an original digital data signal, produced by the character generator of a dot matrix printer, of the type comprising a series of continuous signal pulses of a first value associated with scan line portions of a series of characters which are to be printed and a series of continuous inverse signal pulses of a second value associated with unprinted scan line portions comprising:
   (a) generating a first intermediate signal having signal pulses of a predetermined duration produced in response to the leading edge of each first value signal pulse in the original data signal;
   (b) generating a second intermediate signal having signal pulses of a predetermined duration produced in response to the trailing edge of each signal pulse in the first intermediate signal;
   (c) generating a third intermediate signal having a first signal value when a first value signal pulse of the original data signal is in effect and when at the same time a signal pulse of the second intermediate signal is not in effect and having a second signal value at all other times;
   (d) generating a fourth intermediate signal having signal pulses of a predetermined duration produced in response to the trailing edge of each first value pulse of the original data signal;
   (e) generating a fifth intermediate signal having pulses of a predetermined duration produced in response to the trailing edge of each signal pulse in the fourth intermediate signal; and (f) generating an enhanced digital data signal having a first signal value when the first signal value of the third intermediate signal is in effect and when at the same time a signal pulse of the fifth intermediate signal is not in effect and having a second signal value at all other times.

5. A method for printing characters with an electrostatic printer comprising:
   (a) differentially discharging scan line portions of an electrostatic medium which are associated with characters to be printed by application of a laser beam from a laser in a series of raster sweeps;
   (b) during portions of each raster sweep of the laser associated with characters to be printed:
      (i) energizing the laser for a relatively short, predetermined interval corresponding to a leading edge portion of the associated character; and then de-energizing the laser for a relatively short predetermined interval;
      (ii) re-energizing the laser for a relatively long, predetermined interval corresponding to a central portion of the associated character and then de-energizing the laser for a relatively short predetermined interval;
      (iii) re-energizing the laser for a relatively short predetermined interval corresponding to a trailing edge portion of the associated character and then de-energizing the laser.

6. The invention of claim 5 wherein each step of energizing the laser comprises energizing the laser to the same preset power level.

7. The invention of claim 5 wherein each leading edge energizing interval is sufficiently long and each de-energizing interval is sufficiently short whereby a continuous differentially charged area is provided between the scan line portions corresponding to the leading edge and the central portion of the associated character.

8. The invention of claim 7 wherein each trailing edge energizing interval is sufficiently long and each de-energizing interval is sufficiently short whereby a continuous differentially charged area is provided between the scan line portions corresponding to the trailing edge and the central portion of the associated character.

9. A character display signal generating apparatus for use in a display device which produces a digitized image in a dot matrix format comprising:
   character generator means for generating a first digital data signal comprising unitary signal pulses representative of continuous line portions of characters to be displayed; and
   character signal enhancement means connected to said character generator means for receiving said first digital data signal therefrom and for generating a second digital data signal having sets of pulses corresponding to each unitary signal pulse in said first data signal, each set of pulses in said second data signal comprising a leading pulse and a trailing pulse, the leading pulse in each set of pulses being of equal duration and equal interval spacing from the immediately following pulse, the trailing pulse in each set of pulses being of equal duration and of equal interval spacing from the immediately preceding pulse.

10. A signal enhancement apparatus for modifying an original digital data signal, produced by the character generator of a dot matrix printer, of the type comprising a series of continuous signal pulses of a first value associated with scan line portions of a series of characters which are to be printed and a series of continuous inverse signal pulses of a second value associated with unprinted scan line portions comprising:
   (a) first intermediate signal generating means operably connected to said character generator for generating a first intermediate signal having signal pulses of a predetermined duration produced in response to a leading edge of each first value signal pulse in the original data signal;
   (b) second intermediate signal generating means operably connected to said first intermediate signal generator means for generating a second intermediate signal having signal pulses of a predetermined duration produced in response to the trailing edge of each signal pulse in the first intermediate signal;
   (c) third intermediate signal generating means operably connected to said character generator and said second intermediate signal generating means for generating a third intermediate signal having a first signal value when a first value signal pulse of the original data signal is in effect and when at the same time a signal pulse of the second intermediate signal is not in effect and having a second signal value at all other times;
   (d) fourth intermediate signal generating means operably connected to said character generator for generating a fourth intermediate signal having signal pulses of a predetermined duration produced in response to the trailing edge of each first value pulse of the original data signal;
   (e) fifth intermediate signal generating means operably connected to said fourth intermediate signal generator means for generating a fifth intermediate signal having pulses of a predetermined duration produced in response to the trailing edge of each signal pulse in the fourth intermediate signal; and
   (f) enhanced signal generating means operably connected to said third and fifth intermediate signal generating means for generating an enhanced digital data signal having a first signal value when the first signal value of the third intermediate signal is in effect and when at the same time a signal pulse of the fifth intermediate signal is not in effect and having a second signal value at all other times.

11. The invention of claim 10 wherein said first and fourth intermediate signal generating means comprise pulse generators which produce high value signal pulses and wherein said second and fifth intermediate signal generating means comprise pulse generators which produce low value signal pulses.

12. The invention of claim 11 wherein said third intermediate signal generating means and said enhanced signal generating means each comprise NAND gates.

* * * * *